Figure 1:
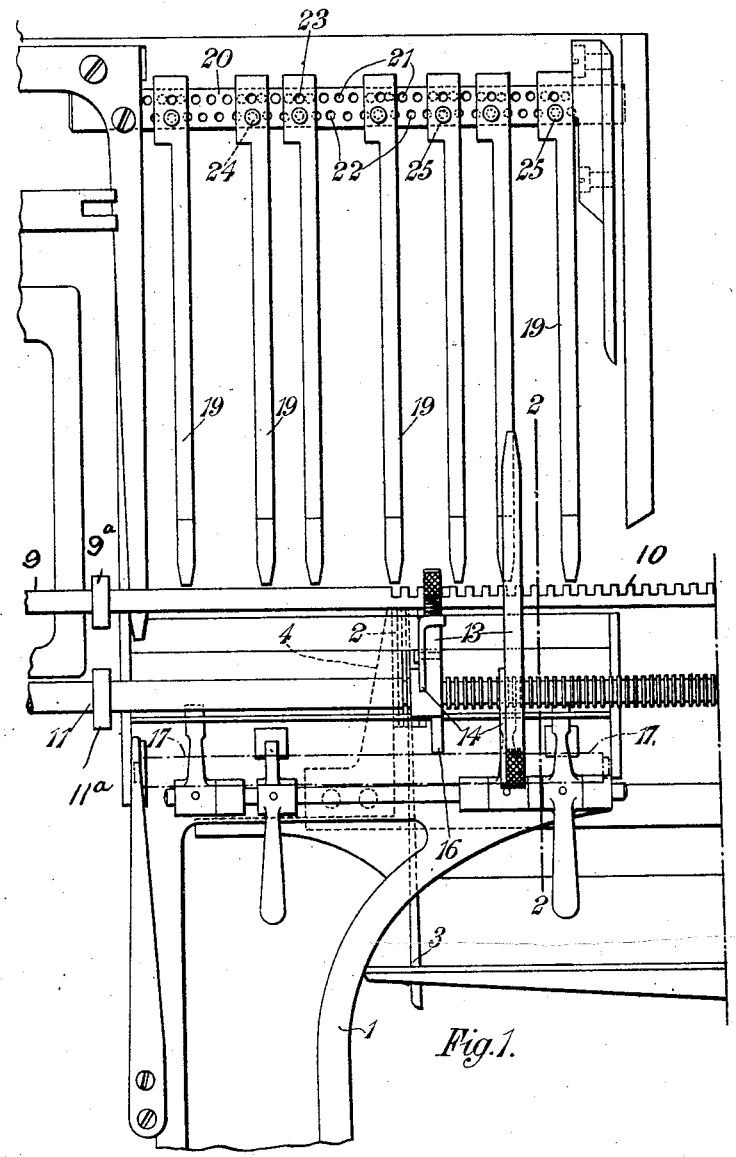

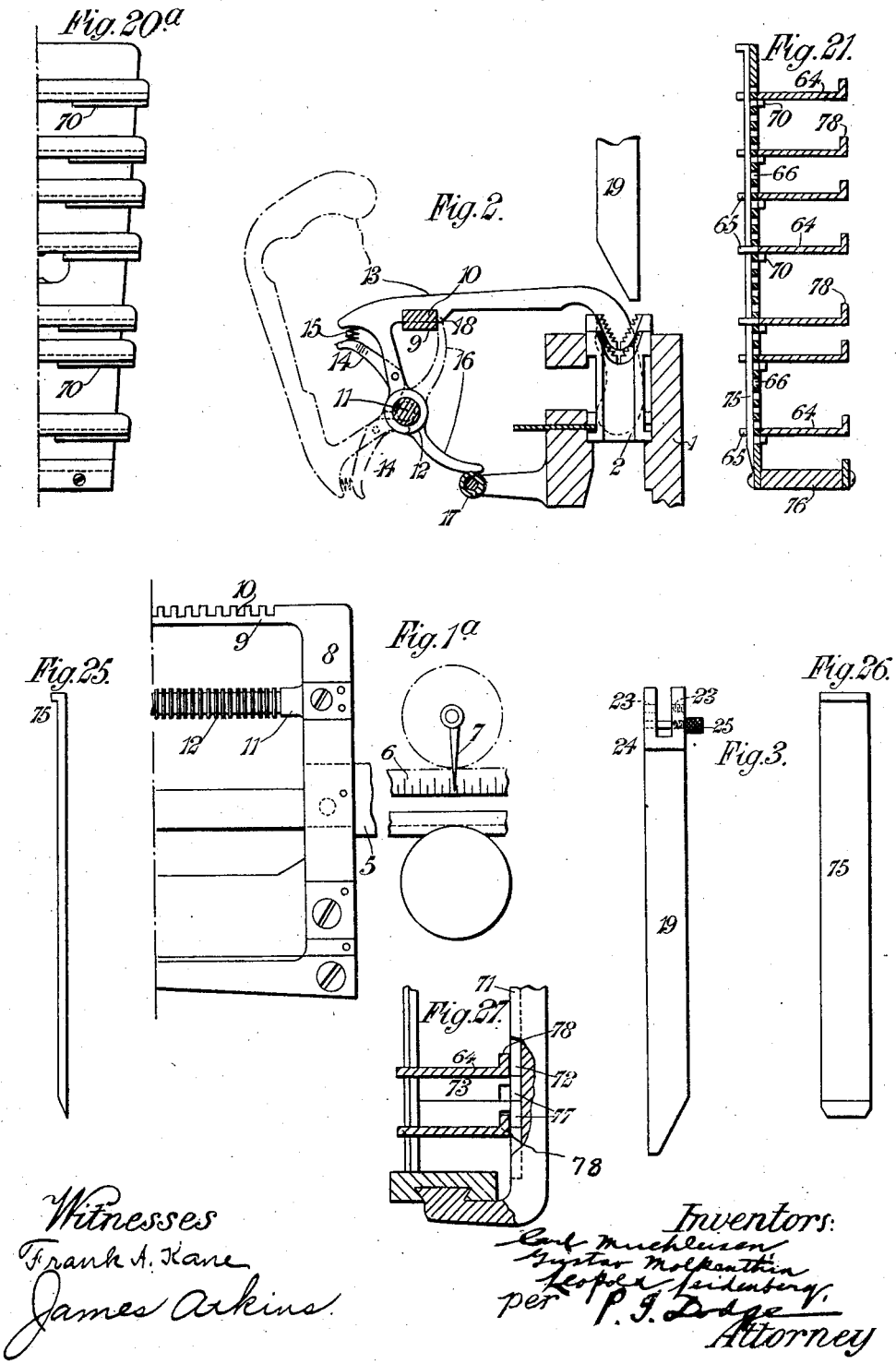

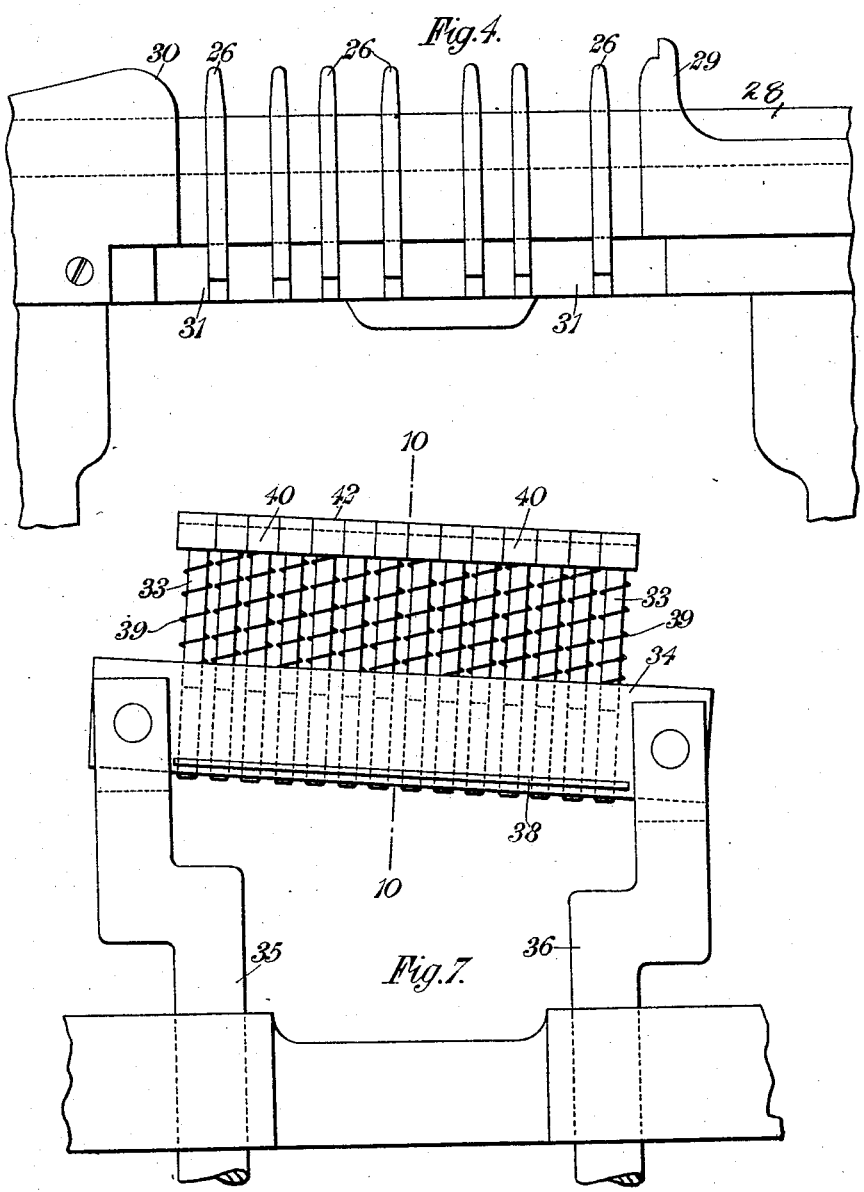

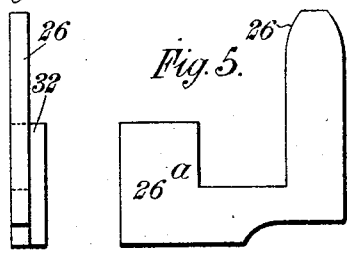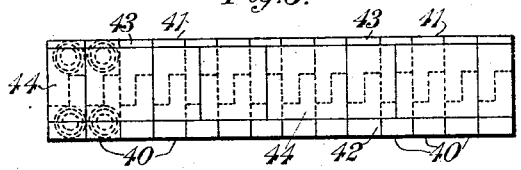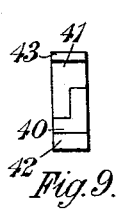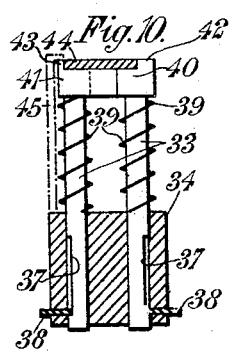

C. MUEHLEISEN, G. MOLKENTHIN & L. LEIDENBERG.
MEANS FOR PRODUCING TABULAR MATTER IN TYPOGRAPHICAL MACHINES.
APPLICATION FILED MAY 7, 1910.
968,490.
Patented Aug. 23, 1910.
11 SHEETS—SHEET 5.
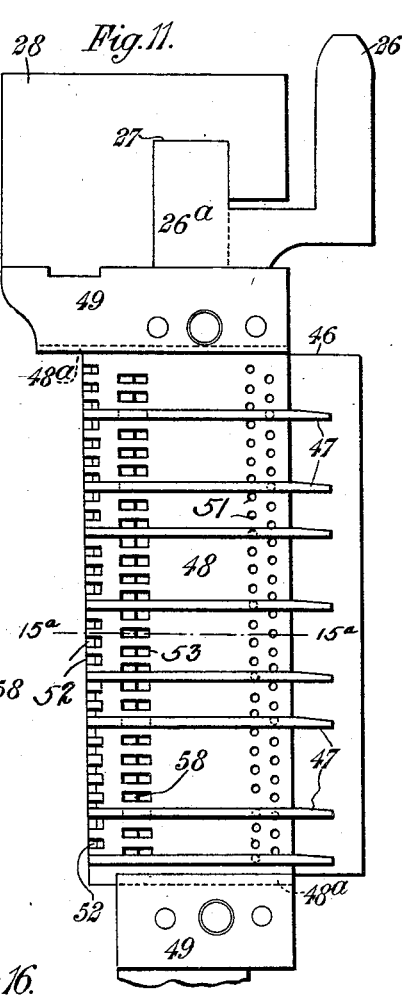
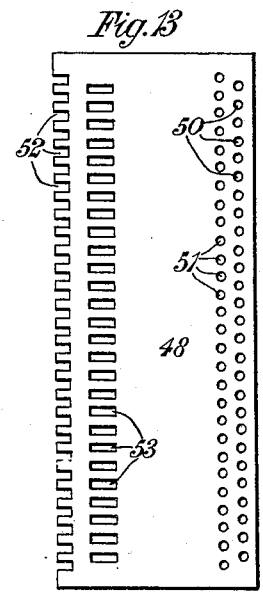
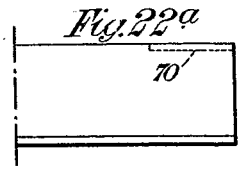
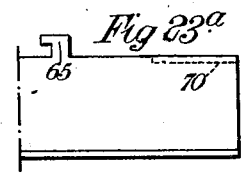

C. MUEHLEISEN, G. MOLKENTHIN & L. LEIDENBERG.
MEANS FOR PRODUCING TABULAR MATTER IN TYPOGRAPHICAL MACHINES.
APPLICATION FILED MAY 7, 1910.
968,490.
Patented Aug. 23, 1910.
11 SHEETS—SHEET 6.
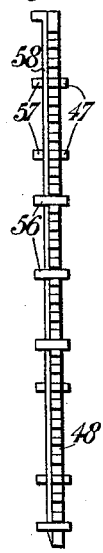
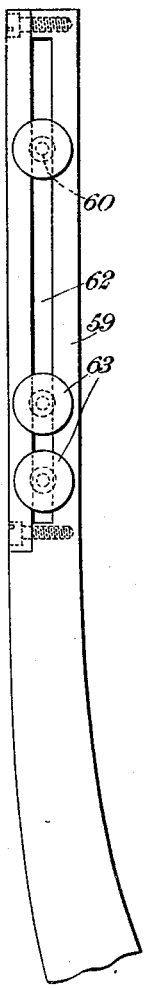
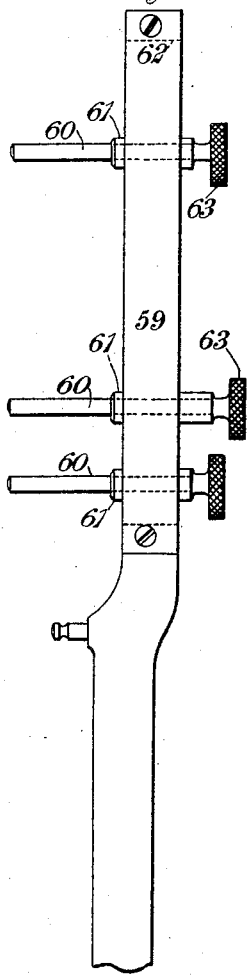
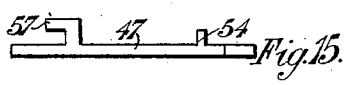

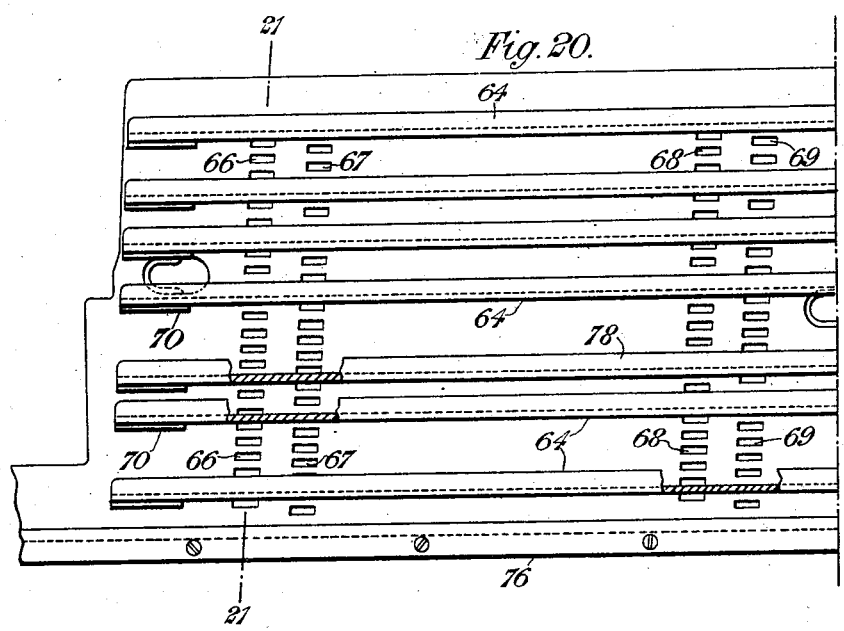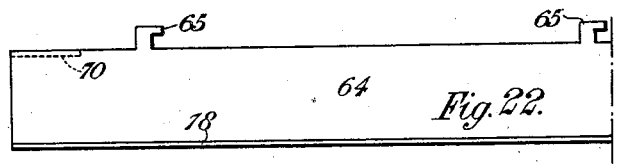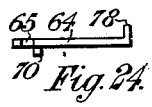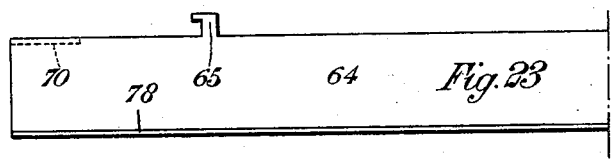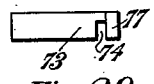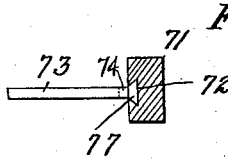

C. MUEHLEISEN, G. MOLKENTHIN & L. LEIDENBERG.
MEANS FOR PRODUCING TABULAR MATTER IN TYPOGRAPHICAL MACHINES.
APPLICATION FILED MAY 7, 1910.
968,490.
Patented Aug. 23, 1910.
11 SHEETS—SHEET 8.
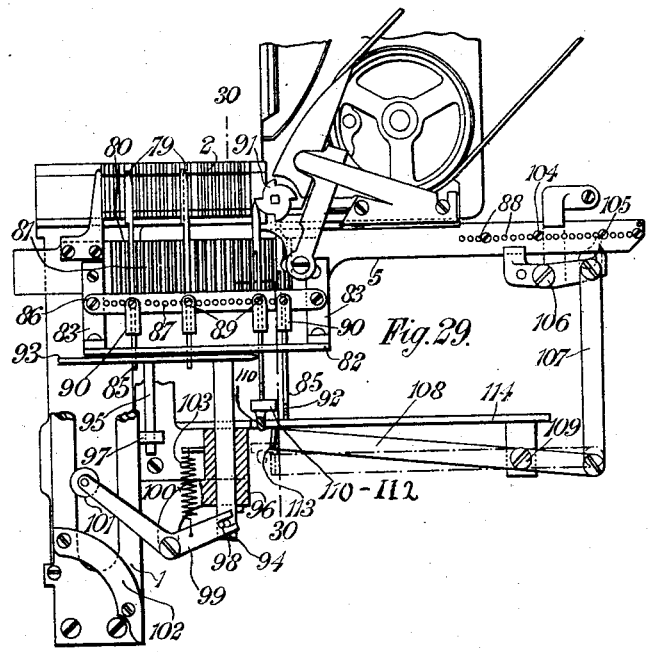
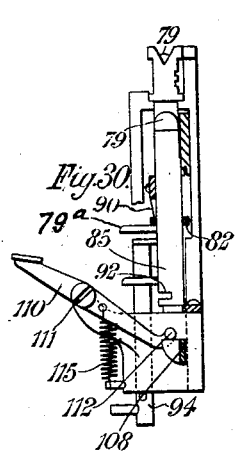
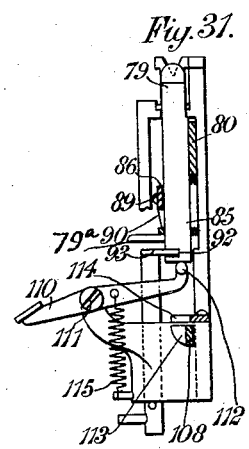

C. MUEHLEISEN, G. MOLKENTHIN & L. LEIDENBERG.
MEANS FOR PRODUCING TABULAR MATTER IN TYPOGRAPHICAL MACHINES.
APPLICATION FILED MAY 7, 1910.
968,490.
Patented Aug. 23, 1910.
11 SHEETS—SHEET 9.
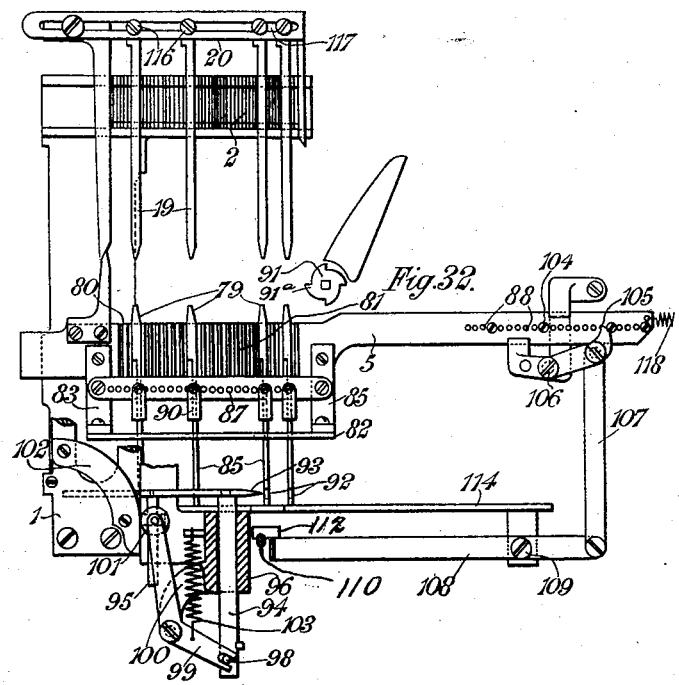

C. MUEHLEISEN, G. MOLKENTHIN & L. LEIDENBERG.
MEANS FOR PRODUCING TABULAR MATTER IN TYPOGRAPHICAL MACHINES.
APPLICATION FILED MAY 7, 1910.
968,490.
Patented Aug. 23, 1910.
11 SHEETS—SHEET 10.
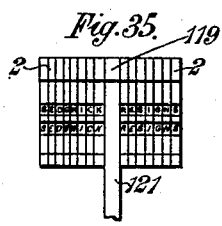
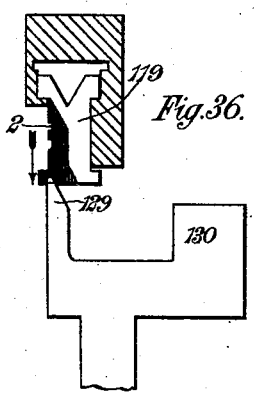
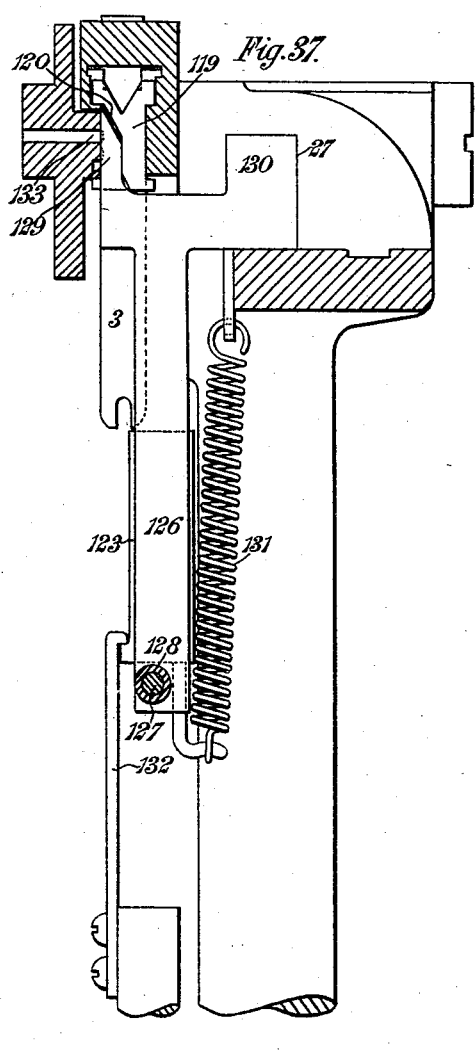

C. MUEHLEISEN, G. MOLKENTHIN & L. LEIDENBERG.
MEANS FOR PRODUCING TABULAR MATTER IN TYPOGRAPHICAL MACHINES.
APPLICATION FILED MAY 7, 1910.
968,490.
Patented Aug. 23, 1910.
11 SHEETS—SHEET 11.
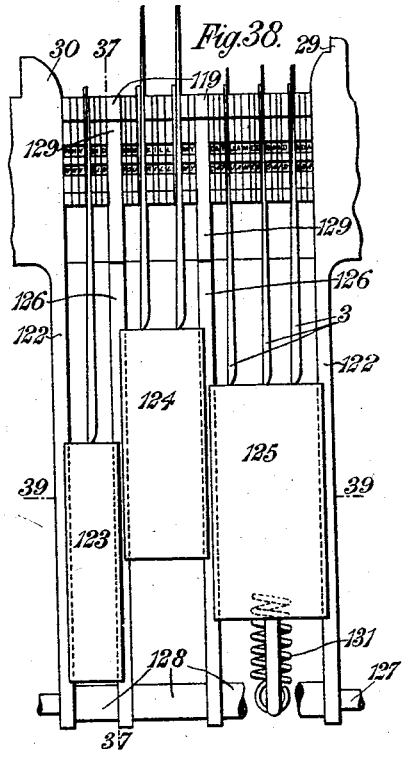
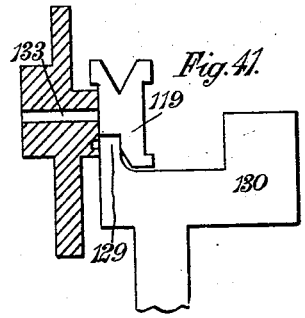
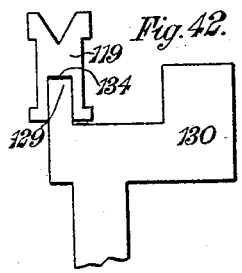
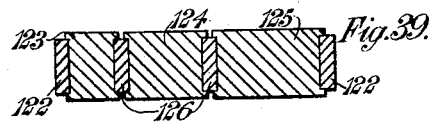
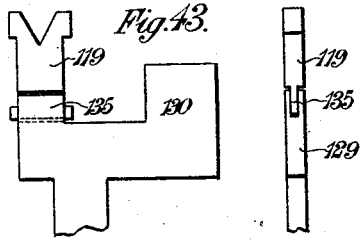
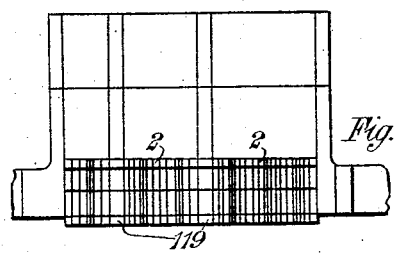

UNITED STATES PATENT OFFICE.

CARL MUEHLEISEN AND GUSTAV MOLKENTHIN, OF BERLIN, AND LEOPOLD LEIDENBERG, OF PANKOW, BERLIN, GERMANY, ASSIGNORS TO MERGENTHALER LINOTYPE COMPANY, A CORPORATION OF NEW YORK.

MEANS FOR PRODUCING TABULAR MATTER IN TYPOGRAPHICAL MACHINES.

968,490. Specification of Letters Patent. Patented Aug. 23, 1910.

Application filed May 7, 1910. Serial No. 559,925.

*To all whom it may concern:*

Be it known that we, CARL MUEHLEISEN, a citizen of the United States of America, and GUSTAV MOLKENTHIN and LEOPOLD LEI-DENBERG, subjects of the Emperor of Germany, residing, respectively, at 88 Chausseestrasse, Berlin, N. 4; 16/II Erasmusstrasse, Berlin, N. W. 89, and 4 Spandauerstrasse, Pankow, Berlin, Germany, have invented new and useful Improvements in Means for Producing Tabular Matter in Typographical Machines, of which the following is a specification.

This invention relates to improvements in the means for producing tabular matter in typographical machines, and it has for one of its principal objects to enable such operations to be performed with less manual labor than has heretofore been necessary for the same class of work.

The invention will be best understood by reference to the accompanying drawings in which the three groups of Figures 1 to 28, 29 to 33, and 34 to 44 represent (all more or less diagrammatically) three different modifications of the invention as embodied in line casting machines known commercially under the trade mark "Linotype."

Of Figs. 1 to 28 illustrative of the first modification: Figs. 1 and 1ª together form a front elevation of a part of the assembler elevator and the means known in the above particularized machine as a "line delivery carriage" by which the assembled line is transferred from the said elevator to the so-called first elevator; Fig. 2 is a vertical section on the line 2—2 of Fig. 1; Fig. 3 is a side elevation of one of the adjustable measure separators of the line carriage shown in Fig. 1; Fig. 4 is a rear elevation of a part of the vise with abutments arranged therein to correspond with the measure separators shown in the upper part of Fig. 1; Fig. 5 is an elevation of one of the abutments, shown in Fig. 4, as seen from the left-hand side of that figure; Fig. 6 is a rear view of a modified form of one of the abutments (this is practically a view from the right of Fig. 5); Fig. 7 is a front elevation of a part of the justification mechanism; Fig. 8 is a plan of part of Fig. 7; Fig. 9 is a plan of two members or heads of the justification block; Fig. 10 is a vertical section on the line 10—10 of Fig. 7; Fig. 11 is an elevation of part of the trimming mechanism, as seen from the right of the machine, omitting the right hand knife, knife block and other parts; Fig. 12 is an elevation of a part of Fig. 11, as seen from the left of that figure; Fig. 13 is an elevation of a plate, and Figs. 14 and 15 plans of guides or ledges attachable to the plate, all of which are shown in assembled condition in Fig. 11; Fig. 15ª is a section on line 15ª—15ª of Fig. 11 showing how the ledges are locked. Figs. 16 and 17 are elevations taken at right angles to each other, of a key shown in its assembled position in Fig. 12; Figs. 18 and 19 are a front and a side elevation respectively of the upper part of the type-bar pusher; Figs. 20 and 20ª together form a front elevation partly broken away, of the galley or chase; Fig. 21 is a vertical section on the line 21—21 of Fig. 20; Figs. 22 with 22ª and 23 with 23ª are plans of two of the shelves detached from the galley; Fig. 24 is an elevation of the left-hand end of the shelf shown in Fig. 23; Figs. 25 and 26 are elevations, taken at right angles to each other, of one of the keys used for locking the galley shelves in position; Fig. 27 is a vertical section through a part of the galley and the yielding resistant which supports the type-bars, and Fig. 28 is an elevation of one of the elements or units of the type-bar support; and Fig. 28ª is a top view thereof, with part of the bracket in section. Of Figs. 29 to 33 illustrative of the second modification: Fig. 29 is a front elevation of part of the assembler mechanism with the assembler elevator shown broken away; Figs. 30 and 31 are vertical sections on the crooked line 30—30 of Fig. 29 looking toward the left of that figure, and showing parts of the apparatus in two different operative positions respectively. Fig. 32 is a view similar to Fig. 29 but showing the assembler elevator raised and the assembled line engaged by the line carriage, and Fig. 33 is a plan of a detached part of the apparatus shown in Figs. 29 to 32. Of Figs. 34 to 44 illustrative of the third modification: Fig. 34 is a side elevation of an improved quad or supplementary measure separator adapted to be composed into the assembled line, and part of a dividing finger or measure separator of the assembler adapted to be associated with the said supplementary separator; Fig. 35 is a rear elevation of an assembled line of two-letter matrices separated into two measures by the devices shown in Fig. 34; Fig. 36 is a vertical section showing a line such as that represented in Fig. 35, being lowered by the first elevator into the vise; Fig. 37 is a vertical section, plus the mold, on the line 37—37 of Fig. 38, which latter figure shows in rear elevation the composed line in casting position; Fig. 39 is a horizontal section on the line 39—39 of Fig. 38. Fig. 40 is a plan of Fig. 38; Figs. 41, 42 and 43 are similar views showing different forms of the supplementary measure separator represented in Figs. 34 to 37, and Fig. 44 is an elevation of the left-hand side of Fig. 43.

There have heretofore been proposed, means provided on the assembler elevator whereby adjustments can be made for enabling successive measures of different predetermined lengths to be successively set; the said means however have involved at least two actions on the part of the operator for each measure to be set, one for moving an abutment or stop into the path of the assembling line of matrices, before the measure is set, and another for moving the abutment or stop out of the said path after the measure has been set and justified, this series of operations being repeated for each of the lines set, and it further involves the somewhat troublesome process of justifying or filling out the measures by the insertion of quads of the required thickness, the selection and manual insertion of these quads absorbing a considerable amount of time. It has further been suggested, in another arrangement, to insert by hand special measure quads at the ends of the respective short measures, as the lines are being assembled in the assembler elevator, the positions at which these measure quads are to be inserted being indicated by a device such as an emmeter, and the special measure quads remaining in the composed line until after the printing bar had been cast therefrom.

Among the advantages attendant upon the use of the present invention there may be mentioned the simpler insertion of the measure separator into the assembling line, and the fact that adjustments made for one line serve for following lines; but besides these, there are others which will be better understood from the following description.

Referring first to Figs. 1, 2 and 3, the assembled elevator 1 is capable of being raised and lowered, and, when in its lower position, of receiving the matrices 2 and space bars or wedge spacers 3 (released from their respective magazines) all in the well known manner, the assembling line gradually extending leftward under the action of the usual star-wheel and against the influence of the usual spring or equivalently-controlled line resistant 4. The resistant 4 is attached to the usual longitudinally movable assembler bar 5 which, on its outer or right hand part, may be marked with a scale 6, of typographical units such for example as pica ems which, in turn, may be subdivided, as shown in Fig. 1ª. An index or pointer 7 is adapted to coöperate, with the scale 6 for indicating the measure or length of a line or portion of a line standing in the assembler elevator 1.

To the assembler bar 5 is rigidly secured the vertical member 8 of a frame whose upper horizontal member 9 is formed with a toothed rack 10, the distance, center to center, between immediately adjacent teeth being that of the before mentioned typographical unit of the scale 6. To the vertical member 8, there is also secured one end of a bar 11 of circular section, which, for a portion of its length, takes the form of an annular rack 12, the pitch of whose teeth is the same as, or, as indicated in Fig. 1, is a multiple of that of the rack 10. The bar 11 and the horizontal member 9 are suitably supported at or near their left-hand ends in guides 9ª and 11ª through which they are respectively free to move longitudinally.

On the bar 11, or more strictly speaking, on the rack 12 of such bar, there is or are mounted one or more measure separators 13 according to the number of separate measures in a line, there being employed for any one divided line at least as many of such separators, less one, as there are measures in the said line. By the term "measure separators" or the word "separator" as herein employed, is meant a piece or device which loosely holds or is adapted to so hold, two adjacent measures apart. Each of the measure separators 13 is capable of being turned about the axis of the bar 11, from the position in which it is shown in dot-and-dash lines in Fig. 2, to that in which it is shown in full lines in the said figure and vice versa, the full-line or separating position being also shown in Fig. 1 in the left hand of the two separators, while the idle position is shown in Fig. 1 in the right hand separator. Each separator has pivoted to it a detent 14, of which one end is adapted to engage between the teeth of the annular rack 12, and the other end is acted on by a spring 15 which tends to constantly maintain such engagement. The spring 15 is resilient enough to yield when the operator applies pressure to it, which he does when he requires to adjust the respective measure separator 13 to a different position along the rack 12; this operation includes the disengagement of the detent 14 from the rack 12 by pressing its outer end against spring 15, causing the detent to swing, followed by the lateral movement of the measure separator 13, along the rack 12 to the desired position, and the subsequent release of the detent by the operator, to allow it to be reengaged with the rack under the action of the spring 15. Each of the measure separators 13 has fast to it, a spur or cam arm 16 adapted, in one position, to bear against the back of the rack 10, as shown in dot-and-dash lines in Fig. 2, and in the other position, as shown in full lines in Fig. 2, to stand in the upward path of a roller or equivalent 17, carried on the front of the assembler elevator 1. The cam arm 16, when bearing against the rack 10, serves for supporting the measure separator in a position from which it can readily be swung rearwardly by the operator, into the full line position wherein its rear portion extends into the channel of the assembler elevator 1, and in which latter position, a tooth 18 at its underside, engages with the rack 10 and thereby, conjointly with the annular rack 12, secures the said separator against lateral deflection. The rear or swinging ends of the measure separators 13 are preferably tapered in a lateral direction so as to facilitate their descent alongside of matrices standing in the channel of the assembler elevator 1.

To maintain the different measures of the line and the interstices between such measures in the same relative positions as those respectively occupied by them in the assembler elevator after the latter has ascended and thereby brought them into the operative sphere of the line delivery carriage—by which organ the transference of the line toward the casting position and subsequent distribution is partially effected—the said carriage is provided with one or more measure separators 19 previously adjusted to occupy in the carriage the same relative positions as do the measure separators 13 in the assembler elevator 1. For this purpose, the said carriage has secured to it a bar 20 having preferably two rows of holes viz:—an upper row 21 and a lower row 22, those of one row being in staggered relationship to those of the other row; the holes of the respective rows are situated in vertical planes at uniform distances apart of the gage of the aforesaid typographical unit. The measure separators 19 have their upper ends bifurcated for enabling them to be readily attached to, and detached from, the bar 20, and each has two holes 23, 24 extending through both members of their forked ends, the hole 23 for alining with the holes 21 and the hole 24 for alining with the holes 22. The holes 23, 24 in the front members of the bifurcated ends of the measure separators 19 are screw-threaded for receiving the correspondingly threaded portions of removable pins 25, whose rear ends are adapted to penetrate the bar 20 and the corresponding rear members of the bifurcated ends of the measure separators 19, and whose front ends are provided with preferably milled heads by means of which they can be readily rotated for enabling them to be engaged with and disengaged from the measure separators 19 and bar 20. When the pins 25 are withdrawn from the measure separators 19 the latter can be entirely removed from the bar 20 or moved to a different position thereon to suit other arrangements of tabular matter.

For maintaining in the vise the different measures of the line and the interstices between those measures, in the same relative positions which they had previously occupied in the assembler elevator 1 and in the line delivery carriage, the vise is provided with a series of abutments 26 each of which may, throughout, be of the same thickness as the previously described measure separators 13, as shown in Fig. 4. The forward parts 26ª of the abutments 26 are shaped to fit into the groove 27 in the vise head 28, see Fig. 11, in which groove the left-hand or movable vise jaw 29 is generally guided. By the word "abutment" as herein employed, is meant a piece or device which, by means independent of the line, is held stationary between two adjacent measures during the justification of the said line. The abutments 26 are maintained at the required measure distance apart or from the respectively-adjacent vise jaws 29, 30 by blocks or distance pieces 31 each of a length corresponding to the respective measure, and each interposed between two adjacent parts 26ª or, in the case of the end abutments, between those abutments and the respectively-adjacent vise jaw 29 or 30; the blocks or distance pieces 31 fit into the groove 27 and serve for rigidly supporting the several abutments 26 against lateral movement during the justification of the composed line.

Instead of the abutments 26 being of uniform thickness throughout, as previously described, and shown in Fig. 4, each may be provided with a thickening or cheek 32 at the part at which it fits into the groove 27, the said cheeks each having preferably the thickness of the typographical unit, in which case each of the blocks or distance pieces 31 excepting one of the end ones, will be of the length of the respective measure less the said typographical unit.

As each of the several measures of the composed line must be justified independently of its neighbor or neighbors and may be set more or less tightly than the other or others of them, the justifier or justification block must be made so that the justifying spacers of the respective measures can be expanded to a correspondingly unequal extent. It has already been proposed, as a means toward this end, to employ a series of independent justifying plates, one for each measure, but this generally involves substitution of different series of plates when different arrangements of tabular matter have to be set. The necessity for making these radical changes in the justifying devices is, according to the present invention, reduced to a minimum, by dividing the justification block into as many as possible separate elements, each capable of being moved vertically independently of the others and providing means for associating them in groups. In this arrangement, shown in Figs. 7 to 10, each of the just-named elements 40 and 41, which latter are hereinafter termed "heads," is fast to the upper end of a stem 33 free to slide in a bar 34 which, as ordinarily, is pivoted to the upper ends of the two justification rods 35, 36, the extent of this sliding movement being determined by the length of a recess 37 formed in the respective stem 33 and with which engages one or the other of two blades (see Fig. 10) 38 fitted into the front and rear respectively, of the bar 34. Each stem 33 is closely encircled by a helical spring 39 which constantly tends to hold the corresponding head 40 or 41 in its highest position relatively to the bar 34. The heads of each pair, regarded in a fore-and-aft direction, are scarfed together but so as to admit of their independent motion. The heads 40 of the front rank and those 41 of the rear rank are provided with upstanding lips 42, 43, respectively which form between them a longitudinal recess for receiving a series of adjustable and interchangeable plates 44. These plates 44 are or may extend varying degrees lengthwise of the recess and, for each particular job, are selected and arranged in the said recess, to suit the different measures of the table to be set up; in effect, they serve to group together two or more of the heads and thereby virtually constitute heads of the lengths called for by the respective measures. Thus each measure of matrices has beneath it a plate 44 of its own length, which plate acts as a justifier head and is yielding through springs of sufficient strength to force upward the wedge spacers, thus justifying the measure; and the plate 44 of each measure is independent of the other plates 44, each having its own yielding support, so that the justification of all the measures is accomplished without conflict, and the spacers of one measure may rise a greater or less distance than the spacers of another measure.

Instead of limiting the upward movement of the stems 33 (relatively to the bar 34) by means of the recesses 37 and blades 38, the same result may be attained by means of a hook plate 45, attached to the bar 34, as shown in dot-and-dash lines in Fig. 10.

The mold in which the lines of tabular matter are cast, and the construction of the device for ejecting them from the mold, form no part of the present invention and may be of any suitable construction, which will, at each casting operation, produce a line of short measure type bars entirely disconnected from each other. The invention is, however, not restricted to its use in connection with casting molds because it is equally applicable for use in connection with flongs in which arrangement, type dies would be employed for indenting the said flongs with the letters or characters in intaglio. For that reason, so far as this invention is concerned, the said flong and its carrier are held to be the equivalent of the mold, and type dies are held to be the equivalent of the matrices.

It will, of course, be readily appreciated that all the measure separators of the first series 13, those of the second series 19 and the abutments 26, hereinbefore mentioned, are of the same thickness, so that, although at different stages of the transference of the composed line through the machine, one set of these devices is substituted for another, the abutments 26 in the composed line, as and when presented to the mold, are in accurate fore-and-aft alinement with the measure separators in the said mold.

The rotary mold wheel and mold are not shown herein, but it will be understood that as usual the properly justified type in the vise and the mold may be brought together into contact, the casting performed, the wheel withdrawn and then rotated, for example a quarter revolution, bringing the cast metal to a position at right angles to the vise, whereat it is to be ejected.

We will now describe the part of the machine that receives the cast line, for that embodiment hereof wherein the metal is in short segregated slugs or measures, understanding that the receiving devices will extend at right angles to the length of the vise.

When the cast line of short measure type bars is ejected from the mold, and passed horizontally from right to left in Fig. 11, between the usual trimming knives 46 (of which only one is shown in the drawings, see Fig. 11) the several type bars of each line must be kept apart. Means consisting of a series of ledges adjustable on a plate have already been proposed for attaining the last-named result but it has not been possible to detach the said means from the machine when re-adjustment of the series has become necessary, without taking off, and afterward re-fixing, some other organ of the machine. According to the present invention the just-mentioned taking off and re-fixing are rendered unnecessary by making the plate which carries the ledges, attachable to and detachable from a part of the machine where such attachment and detachment can be effected without disturbing any other organ of it. Thus, the top and bottom of the plate 48 slide in grooves in the machine which grooves open through the front of the machine and extend rearward as far as the working position of the series of ledges, requires. In the particular machine to which the drawings show the invention as applied, the said grooves are formed in the vise frame 49, on the left-hand side of the port through which the type bars are pushed by the ejector on the way to the galley. 48 is the plate and 48$^a$, 48$^a$, are the grooves in the vise frame 49. The plate 48 is slid into and out of these grooves from the front of the machine, and fits in them sufficiently tightly to prevent its working loose. As shown best in Fig. 13, it is provided with two rows of holes 50 and 51 respectively, the holes of the respective rows being in staggered relationship to each other. It is also provided with a series of recesses 52 in its front edge, and a series of slots 53 adjacent thereto, the slots 53 being in staggered relationship to the recesses 52 and level with the respective holes 50 and the recesses 52 being level with the respective holes 51. The vertical distance between a hole 50 and a hole 51, or a recess 52 and a slot 53, center to center, is that of the before-mentioned typographical unit or a multiple thereof.

The ledges 47 are of two kinds, both provided with pins or projections 54, 55, for engaging with the holes 50 and 51 respectively and they are also provided either with a hook 56 or a hook 57 for engaging with the recesses 52 and slots 53 respectively. The hooks 56 and 57 face in respectively opposite directions as shown clearly in Figs. 14 and 15. They are to be passed through the recesses 52 and slots 53 respectively. The front ends of the ledges 47 are flush with the front edge of the plate 48, the pins 54, 55 engaging in the respective holes 50, 51. A key 58 is then inserted between the hooks 56, 57 and, as the engagement of the pins 54, 55 in the holes 50, 51, prevents the ledges moving, the inserted key 58 locks the ledges to the plate. Figs. 14 and 15 taken with 12 and also Fig. 15$^a$ show how the hooks 56, 57 overlie the key 58, which latter locks the former. The relation of these parts is also shown in Fig. 11, the key 58 showing through the unoccupied apertures as extending crosswise of the ledges 47 in a position to engage the hooks.

From the foregoing it will be seen that the ledges 47 can be readily applied to the plate 48 and adjusted thereon to positions corresponding with the interstices between the respectively adjacent short measure type bars of the line and with the before-described measure separators 13 and 19 and abutments 26; the ledges 47 are thinner than the said dividers and abutments, to enable the cast type bars to freely pass between them.

To enable the so-called pusher to move the several short measure type bars of a line along the respective shelves of the galley or chase, the said pusher 59, as shown in Figs. 18 and 19, is provided with a series of adjustable pins 60; the number of these pins 60 corresponds with that of the several type bars of the line, the three represented in Figs. 18 and 19, are shown merely as examples of the eight which would be necessary to conform with the arrangements shown in Figs. 1, 4 and 11. Each of the pins 60 is provided with a collar 61 rigid thereon, and is capable of being adjusted along a slot 62 in the pusher lever 59, and of being clamped in any such adjusted position, by means of a milled headed nut 63. The heads of alternate nuts 63 are situated in different vertical planes so as to admit of the pins being adjusted closer together than would be the case if they were situated all in the same plane, because, in the latter case, they could never be closer than the distance represented by the sum of the radii of two adjacent heads, whereas by the arrangement shown in Fig. 19, the heads can be caused to overlap.

The improved galley or chase represented in Figs. 20 to 27, has, in addition to the usual non-adjustable or fixed shelf 76, a plurality of shelves 64, which are adjustable to different heights relatively to the fixed shelf. For this purpose each such shelf 64 is provided with two hooks 65, the hooks of some shelves facing in opposite directions to those of the other shelves as shown in Figs. 22 and 23. The back of the chase is provided with four rows or series of slots 66, 67, 68 and 69 for receiving the hooks 65, the said rows, as shown in Fig. 20, being arranged in pairs; adjacent rows are arranged to receive the oppositely-directed hooks of different shelves, so that, by means of a key 75—Figs. 21, 25 and 26—inserted between those hooks, at the rear of the chase-back, the shelves can be locked to the said back in practically the same manner as has been already described in connection with the locking of the ledges 47 to the plate 48 shown in Figs. 12 to 15 and 15$^a$. The slots 66, 67, 68, 69, as regards their vertical position, are spaced apart on the basis of the typographical unit which has been already mentioned in relation to, for example, the slots 53 and recesses 52 shown in Fig. 13. Each of the adjustable shelves is provided with two downwardly-extending flanges 70 which assist in supporting the said shelf in horizontal position, and it is also provided with the usual front lip 78.

For supporting the several short measures delivered to the chase, in a vertical or practically vertical position, there is provided, as shown in Fig. 27, an angular bracket 71 which, by a dovetail on its horizontal member, is guided in or on the bottom shelf 76 of the chase, so as to leave it free to move only in horizontal direction—or the bracket may be guided on the machine frame—whatever the construction in this respect, there is provided a spring or other device (not shown in the drawings) for presenting a suitable resistance to the travel of the bracket. The vertical member of the bracket is formed with a dovetail groove 72 see Figs. 28 and 28ª for receiving the dovetail ends 77 of blocks 73 one or more of which is or are applied for each of the shelves 64, according to the length of the short measure type bar received on the said shelf. Each of the blocks 73 is formed with a recess 74, see particularly Fig. 28, by which it can be guided along the respective front lip 78, as shown in Fig. 27, and each said block is of a height equal to the length of the shortest type bar which will be received on the respective shelf, so that for a shelf receiving such a type bar only one block would be used, while for longer type bars received on other of the shelves 64, two or more superimposed blocks would be used, as shown, for example, in Fig. 27.

The foregoing devices are used as follows:—The operator first adjusts the assembler elevator measure separators 13 to positions appropriate to the interstices or divisions in the line of tabular matter to be produced, this being effected while the said separators are in the dot-and-dash line position in Fig. 2, and, by disengaging the respective detents 14 from the rack 12, moving the said separators right or left along bar 11 and then allowing the detents to reengage with the rack 12 of bar 11. The line-carriage separators 19, the abutments 26, the plates 44 of the justifier, the ledges 47, and the chase shelves 64 are then also correspondingly adjusted to suit the different measures of the line to be cast. The operator then composes the first measure of the line inserting thereinto one or more space bars 3 in the usual way, and when the end of that measure is reached, as is indicated by the emmeter 6, 7 or otherwise, he turns the first of the measure separators 13 from the dot-and-dash line position to the full line position of Fig. 2, so that the rear part of the said separator projects down into the channel of the assembler elevator 1 at the right hand end of the said measure. He then proceeds to set the second measure of the line in the same manner as the first, and, at the end thereof, turns the second of the measure separator 13 into the full line position, and so on with all the subsequent measures of the line, excepting the last one which required no separator at the end of it, the right-hand vise jaw 30 serving to support the end of that measure. The composed line is then dealt with by the respective organs of the machine in practically the same way as heretofore, excepting that as the said line is successively transferred from one organ to another, the respective sets of measure separators and abutments become automatically and successively substituted for each other. Thus, when the assembler elevator 1 is raised to bring the composed line under the control of the line-shifter carriage, the roller 17 (which is seen in Fig. 1 to extend the entire width of the assembler), comes into contact with the cam arms 16 of all of the separators 13 which have been inserted into the line, and turns those separators from the full line to the dot-and-dash line position of Fig. 2, the line being moved into engagement with the separators 19 at practically the same instant as the separators 13 are swung clear of it, the cam arms 16 being so shaped as to provide for this timing of the respective disengagement and engagement. When the line is removed from the control of the separators 19 and introduced between the vise jaws 29, 30, its several measures are retained in their relative positions by the abutments 26, during both the justifying and casting operations. After the line of short measure type bars has been cast, the composed line of matrices and space bars is distributed in the well-known way, and the said bars are moved over the respective ledges 47 in the vise frame 49 and on to the respective shelves 64 of the chase.

In the foregoing arrangement, the separators 13 being situated at the front of the assembler elevator 1 and adapted to enter the channel of the latter at the top thereof, may be found to interfere with access being had to such elevator for correcting lines in course of composition. This disadvantage is overcome by the arrangement shown in Figs. 29 to 33, which also provides for the insertion of the measure separators into the assembling line by the actuation of a special key. In this said arrangement the separators 79 are caused to enter the assembling line from below and move rectilinearly as distinguished from the previously described arrangement wherein the separators 13 move curvilinearly. According to this arrangement, the assembler bar 5 near its left-hand end, is expanded into, or formed integral with, a plate 80 having a series of vertical grooves 81 located apart at the gage of the before mentioned typographical unit. These grooves 81, conjointly with a plate 82, serve to guide the separators 79 in their upward and downward movement, the rear edges of the separators 79 being vertically slidable in the said grooves. The plate 82 is secured to the assembler bar 5 by two brackets 83, and, as shown in Fig. 33, is provided with a series of slots 84 adapted to receive the downwardly-depending tails 85 of the separators 79, the adjacent slots 84, like adjacent grooves 81, being at a distance apart corresponding with the above-named typographical unit. To the front of the brackets 83 there is secured a bar 86 having a series of screw-threaded holes 87, while the assembling bar is also provided with a corresponding series of screw-threaded holes 88, the holes 87 and 88 being spaced apart to correspond with the grooves 81 and slots 84. The holes 87 are adapted to receive screws 89 by which brake springs 90 can be secured to the bar 86 in positions corresponding to those occupied by the respective separators 79, the said brake springs 90 being adapted to bear on the front edges of the separators with sufficient strength to prevent the said separators from being accidentally lowered from their raised position. The upper ends of the separators 79 are tapered to facilitate their insertion between the last of the matrices 2 assembled in the elevator 1 and the star wheel 91, which latter, as shown in Figs. 29 and 32, and as distinguished from the ordinary star wheel, has its arms 91$^a$ curved on the side nearest the rising separator so as to enable this insertion to be effected without the said arms coming into violent contact with the upper end of the separators. The separators 79 or more strictly speaking, the tails 85 thereof, are formed with recesses 92 in their front edges, for enabling them to be threaded on to or engaged with a horizontal rail or separator supporter 93 when they are raised up to the level thereof by the operator, and pushed thereonto by the star wheel 91. The rail 93 is free to move vertically to the same extent as do the separators 79 in moving between their two terminal positions, and for this purpose, it is provided with two downwardly-extending bars or legs 94, 95 guided respectively in lugs or guides 96, 97 fast to the stationary frame of the machine. To the bottom end of the leg 94, there is connected by a pin-and-slot connection 98, one arm of a bell-crank lever 99 pivoted to a bracket 100 fast to the guide 96, and whose other arm is provided with a bowl or anti-friction roller 101 adapted to be engaged by a cam 102 secured to the assembler elevator 1. The lever 99 is acted on by a spring 103 which tends to hold it and the rail 93 in the positions which they respectively occupy in Fig. 29, and which returns the said devices to those positions after they have been moved therefrom by the cam 102 as hereinafter more fully described.

The before mentioned holes in the assembler bar 88 are screw-threaded for receiving screws or stops 104 which, for any given job, are inserted in positions corresponding with the positions in which the separators 79 are to be inserted into the assembling line. The screws 104 are for stopping the travel of the assembler slide 5 by coming into contact with a proper detent at such points according to the adjustments of the screws 104 as to enable the operator to raise one of the separators 79 into the proper point in the line. These screws 104 are adapted to engage with a detent 105 capable of turning about a fixed pivot 106 and which is pivotally connected to the upper end of a link 107 whose lower end is similarly connected to one arm of a controller lever 108. This lever 108 is pivoted upon a fixed stud 109 and its left-hand end is adapted to be engaged by the rear end of a key lever 110 which is pivoted upon a fixed stud 111 and whose front end is adapted to be depressed by the operator when a separator 79 has to be added to the assembling line. The rear end of the key lever 110 is formed with a broadened head 112 over which the tails 85 of the separators 79 are presented in turn, at the time at which they are respectively to be added to the line; it is this head also, which directly acts on the adjacent end of the controller lever 108, which latter, for this purpose, is provided with a forwardly-projecting member 113. In their lower position the separators 79 are supported by, and capable of moving over, the top of a plate 114, the notches or recesses 92 of the tails 85 being then in the same horizontal plane as the rail 93, and the upper ends of the separators 79 being at such a level that they will clear the star wheel 91 when they are passed beneath it. The notches or recesses 92 are stated to be at the same horizontal level as the rail 93, as seen in Fig. 32, the rail there being in its lowest position, for the reason that it is the rail that causes the separators to descend by reason of its engagement with their notches. The notches and rail have previously been engaged while forming a line and the two together have descended, necessarily in engagement; and this engagement is maintained until the assembler bar 5 drawing toward the right threads the notches 92 off of the rail, thus liberating the latter and allowing it to resume its upward position as in Fig. 29. A spring 115 serves to return the key lever 110, and, through it, the controller lever 108 to their respective normal positions, and when they are in the said positions, the detent 105 is held in the path of the studs or screws 104 as shown in Fig. 32.

Fig. 32 shows another construction of the line-shifter carriage. In this arrangement the separators are connected to the bar 20 by means of clamping screws 116 which penetrate a slot 117 common to all of such screws.

In the operation of the arrangement shown in Figs. 29 to 33, the operator inserts the separators 79 into the particular grooves 81 and slots 84 appropriate to the different measures to be produced in the line to be cast, and correspondingly varies the positions of the brake springs 90, studs 104, and line carriage separators 19. He then proceeds to set the line in the ordinary way, until the end of the first measure is reached, at which juncture the first of the studs 104 comes into contact with the detent 105 and thereby arrests the travel of the assembler bar 5 and directs attention to the fact that a separator 79 is due to be added to the assembling line. At this time the first of the separators has passed beneath the star wheel 91 and arrived over the head 112 of the key lever 110, so that when the operator depresses the said lever, as he must then do, this separator is raised and in consequence thereof, its upper end is introduced between the star wheel 91 and the last set matrix 2 or space bar 3. The depression of the forward end and consequent raising of the rear end of the key lever 110, allows the left hand end of the controller lever 108 to ascend under the weight of the other end thereof combined with that of the link 107 and detent 105 (or a spring may be used for assisting in this operation), and by this movement the detent 105 is lowered out of engagement with the respective stud 104 and the assembler bar 5 is thereby released. The star wheel 91 then moves the separator 79 and the preceding part of the line, leftward so that the notch 92 of the separator passes on to the rail 93 as shown in connection with the two left-most separators represented in Fig. 29, the third of the separators shown in that figure being represented as in the course of its ascent.

The operation described in the immediately preceding paragraph is repeated for each of the other separators to be afterward inserted in the line, and when the line is completed and the assembler elevator, as ordinarily, is raised, the separators 79 remain stationary and thus become withdrawn from the ascending line. When in their raised position, the upper ends of the separators 79 are close to the lower ends of the separators 19 so that before the line has been moved clear of the former separators (79) it has become engaged with the latter ones (19) which thereafter serve to maintain the different measures of the line in their respective positions. By the time that the assembled line has reached the separators 19, the cam 102 has come into contact with the roller 101 so that, by the further ascent of the elevator 1, the lever 99 is turned from the position in which it is shown in Fig. 29 to that in which it is shown in Fig. 32, by which operation the rail 93 and the separators 79 engaged therewith, are lowered into their lowest positions, and the assembler bar 5 is thereby allowed to return to its normal position under the pull of the usual spring 118, or otherwise. When the assembler elevator 1 descends, and the cam 102 thereby caused to disengage the roller 101, the spring 103 returns the lever 99 and rail 93 to their respective normal positions.

Instead of the separators 79 being raised by a key lever such as 110 as hereinbefore described, they can be arranged to be raised by hand, as by means of forwardly-extending fingers 79ª, Figs. 30 and 31, in which arrangement, the disengagement of the detent 105 from the studs 104 would be preferably made directly dependent upon the vertical movement of the said separators. That is to say the shape of the lever 108 or the position of its left hand end would be so changed as to depend upon the separator tail 85, Figs. 30 and 32, being in its lowest position to keep the lever 108 in its normal position shown in said figures, which would be an obvious change; or in lieu thereof the operator could in any other manner cause the detent 105 to descend at the same time that the separator is elevated.

In the arrangement represented in Figs. 34 to 44, the different measures of the composed lines of matrices are maintained in their relative positions, during their transference from the assembling to the casting position, by supplementary measure separators or quads 119 which are composed into the line in the assembler elevator 1 and distributed in the ordinary way. Each of the separators or quads 119, as shown in Fig. 34, is formed with a recess 120 in its rear edge, adapted to engage with or receive a separator 121 which, relatively to the corresponding separators on either side of it, is laterally adjustable in position (for example by means of grooves 81 and perforated plates 86 and 82, as shown in Fig. 29) to correspond with varying measures, and which separator is, or may be, capable of being raised and lowered in practically the same manner as that hereinbefore described with reference to the measure separators 79 shown in Figs. 29 to 32. In a line composed with the supplementary measure separators 119, and with the separators 121 extending thereinto as shown in Figs. 34 and 35, each of the latter is, as it were, sandwiched between two matrices 2, or a matrix 2 and space bar 3, and, being locked against lateral movement, the said separators act as fixed buttresses for supporting the respective ends of the different measures. Only small portions of the separators 121 are shown in the drawings, see Figs. 34 and 35, because it is assumed that, from the previous description of the measure separators 79, which serve in a practically similar capacity, this part of the invention will be sufficiently understood without further illustration. In fact for disclosing the connection and operation of the separators 121 and the construction of their lower portions, Fig. 29 itself may be considered as an illustration. In this same arrangement the vise jaws 29, 30 are provided with downward extensions or guide bars 122 which serve to guide the justification blocks 123, 125 which are adjacent thereto. Between the two outer justification blocks 123, 125 there may be one or more other such blocks 124 according to the number of measures into which the lines are divided; in the example illustrated, wherein the line is divided into three measures, there are three blocks 123, 124 and 125, each of which is of a length corresponding with that of the respective measure. Between the two guide bars 122 there are provided two other guide bars 126 which serve to guide the justification block 124 as well as the inner edges of the two outer blocks 123, 125. The lower ends of the guide bars 122, 126 have threaded through them a rod 127 on which are also threaded tubular distance pieces 128 which serve to keep the guide bars 122, 126, at the correct distances apart. The blocks 123, 124 and 125, are vertically grooved at the edges by which they are guided on the bars 122, 126, as shown best in Fig. 39, which also shows that no two of the said blocks are in rubbing contact with each other. The upper ends of the two inner guide bars 126 are provided, at their rearward parts, with upwardly-extending abutments 129 adapted to engage with the recesses 120 of the supplementary measure separators 119 when the latter are between the vise jaws 29, 30, in the same way as do the separators 121 during the time that the assembled line is in the assembler elevator 1. The said upper ends are also provided with forward extensions 130 of a shape adapted to fit the groove 27 by which the right-hand vise jaw 30 (left-hand in Figs. 38 and 40) is guided.

The guide bars 122, 126 and abutments 129 are adjusted so that they occupy in the vise, the same relative positions as do the separators 121 in the assembler elevator, the jaws 29 and 30, and extensions 130 being held apart from each other by intermediate distance pieces or in other convenient manner. To the lower end of each of the justification blocks 123, 124, 125 is operatively connected a spring 131 (only one is shown in the drawings) which tends always to raise the said block and thereby also to expand the appropriate space bar or space bars 3, the justification block being pulled down at the desired times by a hook 132 actuated by the appropriate justification cam. When this cam allows the springs 131 to raise the blocks 123, 124, 125, the respective measures of the line are justified by the expansion of the space bars 3, the measures themselves being retained within their respective limits by the jaws 29, 30, and abutments 129. When adjustments have to be made for enabling the machine to cast lines with differently arranged measures, that is to say, different in relation to the measures provided for by a previous adjustment, the separators 121 on the assembler elevator 1, can be adjusted on the latter in the manner previously described with reference to Figs. 29 to 33 or otherwise, and the rod 127 is withdrawn from the guide bars 122 and 126 and from the tubular distance pieces 128, (which are or may be of varying lengths to correspond with the other adjustments), the blocks 123, 124 and 125 are removed, and the said bars 122, 126, are moved laterally to the positions corresponding with those occupied by the respective separators 121 in the assembler elevator 1. The justification blocks 123, 124, 125 and distance pieces 128 are then re-arranged, or other ones of the desired width or length are inserted between the bars 122, 126 and the rod 127 is replaced in position and secured therein in any desired manner.

Instead of the supplementary measure separators 119 being of the form shown in Figs. 34 to 38 which involves the presentation of a part of the abutments 129 to the mold slot 133, as shown in Fig. 37, the said supplementary separators 119 may be of the shape shown in Fig. 41, in which case the rear edges of the said abutments, although alining with the corresponding edge of the supplementary separators 119, and consequently contacting with the front face of the mold, do not reach up to the mold slot 133.

The two supplementary measure separators 119, constructed as before described, involve the omission of the rear bottom lugs thereof, but those shown in Fig. 42 and Figs. 43, and 44 respectively, avoid such omission. In the arrangement shown in Fig. 42, the foot of the supplementary separator 119 is formed with a central recess 134 of a size approximately that of the abutment 129 which fits into it, it being always understood that the thickness of the abutment must also be that of the supplementary measure separator. In the arrangement shown in Figs. 43 and 44, the abutment 129 is bifurcated as at 135, at the part at which it is adapted to engage with the supplementary separator 119, which latter, at its lower part, has its thickness reduced so as to enable it to fit into the fork 135 in the manner shown best in Fig. 44.

The before described devices are capable of being modified without departing from the essential features of the invention, and, as an example of one such modification, it may be explained that, instead of the guide bars 126 being formed integral with the abutments 129 as represented in Figs. 36, 37 and 38, they may be formed separate therefrom.

The first separators, those inserted during composition, constitute means for dividing the line into groups of predetermined length during assemblage, while the separators on the carriage or the intermediate abutments, or both, may be considered as automatic means for preserving the groupal division of the line during its manipulation and transfers subsequent to complete assemblage; automatic in the sense that these parts are part of the machine and perform their functions by reason of their mechanical connections and associations, rather than necessitating manual insertion. The jaws, 29, 30, of the vise may be considered as end abutments, coöperating with the intermediate abutments 26. An intermediate abutment may be considered as a kind of "separator", because it maintains the separation of the groups; although as an abutment it does more, for it holds each group to an exact relative position during the justification. This set of abutments in a sense constitutes a complete device or instrumentality, which is adapted to be associated with the line of matrices, not during, but after the complete assemblage of the line, and indeed after its transfer away from the assembler or assembling mechanism. The several compartments between the abutments may for convenience be considered as being cells, each cell for receiving in it all the matrices constituting one of the short measures, and the entirety may therefore in the claims be designated a celled or compartmented device. The purpose of it is to divide, or keep divided, the line into short groups or measures, and in such a way that the initial of each group will invariably come in a predetermined exact position, the justification serving only to independently justify each group, while not disturbing the abutments. Thus a table printed from successive lines composed in this machine will have each column in accurate vertical alinement. The abutment device comprises a part such as the vise stock, which serves as an interconnection between all the abutments, and for holding them at their fixed predetermined positions.

By an interstice between matrices or groups we refer to any space therebetween capable of occupation by a separator or abutment, whether or not occupied thereby. Where in the claims we refer to a "set" of separators, abutments, shelves or the like, we mean a set of either more than one, or in some cases a single one, which latter case would be that employment of our improvements where a table with only two columns is to be printed.

It has been above stated that the abutments of the vise serve to keep the line divided into short groups in such a way that the initial of each group will invariably come in a predetermined exact position; and it will be clear that this description substantially applies also to the first separator mechanism or that operating during assemblage of the line. These temporary separators when adjusted have their positions fixed so that as they are inserted into the line being assembled, they not only divide the line into groups of predetermined length, but also locate the initial matrices of the respective groups in exact positions relative to the line ends in accordance with the requirements of the tabulation to be produced. This grouping and this exact locating of initial matrices are both preserved throughout subsequent operation, the separator fingers on the line carriage maintaining the groups and locations during transfer, and as before stated the abutments of the vise preserving both the grouping and initial locations during justification and casting.

Having described our invention we claim and desire to secure by Letters Patent:—

1. In a typographical machine, the combination of means for assembling matrices in line, means for dividing the line into groups of predetermined length during assemblage, means for transferring the assembled line from the assembling means to another part of the machine, automatically operating parts independent of and adapted to coöperate with the line after assemblage for preserving the groupal division of the line during its said transfer.

2. In a typographical machine, the combination of means for assembling matrices in line, means for dividing the line into groups of predetermined length during assemblage, and automatically operating parts coöperating with the line after assemblage for preserving the groupal division of the line during its subsequent transfer to the casting position.

3. In a typographical machine, the combination of means for assembling matrices in line, means for dividing the line into groups of predetermined length during assemblage, and automatically operating parts inserted in the line after assemblage for preserving the groupal division of the line during its subsequent transfer to the casting position.

4. In a typographical machine, the combination of means for assembling matrices in line, means for dividing the line into groups of predetermined length during assemblage, justifying mechanism and means for conveying the assembled line thereto, and automatically operating parts coöperating with the line after assemblage for preserving the groupal division of the line during its transfer.

5. In a typographical machine, the combination of means for assembling matrices in line, means for dividing the line into groups of predetermined length during assemblage, justifying mechanism and means for conveying the assembled line thereto, and automatic means comprising parts inserted in the line after assemblage for preserving the groupal division of the line during its transfer to the casting position.

6. In a typographical machine, the combination of means for assembling matrices and spacers in line, means for dividing the line into groups of predetermined length during assemblage, justifying mechanism and means for transferring the assembled line thereto, and automatically operating parts coöperating with the line after assemblage for preserving the groupal division of the line during its said transfer.

7. In a typographical machine, the combination of means for assembling matrices and spacers in line, means for dividing the line into groups of predetermined length during assemblage, justifying mechanism and means for transferring the assembled line thereto, and automatic means comprising parts inserted in the line after assemblage for preserving the groupal division of the line during its said transfer.

8. In a typographical machine for tabular matter, the combination of means for assembling matrices in line, mechanism operating during assemblage for dividing the line into groups of predetermined length and for locating the initial matrices of the respective groups in exact positions relative to the line ends as required by the tabulation to be produced, means for transferring the assembled line to a justifying mechanism, independent means for preserving such groupal divisions and exact initial locations during the transfer of the assembled line to the justifying mechanism, and a justifying mechanism operating independently on each group for justifying all said groups after the line's complete assemblage.

9. In a typographical machine for tabular matter, the combination of means for assembling matrices in line, independent mechanisms operating respectively during assemblage and after assemblage for dividing the line into groups of predetermined length and for locating the initial matrices of the respective groups in exact positions relative to the line ends as required by the tabulation to be produced, and a justifying mechanism operating independently on each group for justifying all said groups after the line's complete assemblage and while said groupal divisions and exact initial locations are maintained.

10. In a typographical machine for producing tabular matter, a mold, a celled device coöperating therewith and comprising end and intermediate abutments and means interconnecting all said end and intermediate abutments into a single device, said device constructed and fitted for all said end and intermediate abutments to coöperate with the composed line subsequent to its assemblage for dividing the line into short measures.

11. In a typographical machine for producing tabular matter, a celled device comprising interconnected end and intermediate abutments and constructed and fitted for all said end and intermediate abutments to coöperate with the composed line subsequent to its assemblage for dividing the line into short measures, in combination with mechanism for justifying the several measures between the abutments.

12. In a typographical machine for producing tabular matter, a celled device comprising interconnected end and intermediate abutments and constructed and fitted for all said end and intermediate abutments to coöperate with the composed line subsequent to its assemblage for dividing the line into short measures, in combination with an assembler, means for producing interstices in the line during assemblage and means for associating the line and said device so as to cause its intermediate abutments to be engaged in said interstices of the line.

13. In a typographical machine for producing tabular matter, a celled device comprising interconnected end and intermediate abutments and constructed and fitted for all said end and intermediate abutments to coöperate with the composed line subsequent to its assemblage for dividing the line into short measures, in combination with mechanism for justifying the several measures between the abutments, an assembler, means for producing interstices in the line during assemblage and means for associating the line and said device so as to cause its intermediate abutments to be engaged in said interstices of the line.

14. In a typographical machine for producing tabular matter, a device comprising end abutments or jaws and one or more intermediate abutments, the said device constructed and fitted to be associated with the composed line subsequent to its assemblage for dividing the line into short measures, and means interconnecting all said abutments for holding them fixed at predetermined positions, in combination with mechanism for justifying the several measures between the abutments so held.

15. In a typographical machine for producing tabular matter, a device comprising end abutments or jaws and one or more intermediate abutments, the said device constructed and fitted to be associated with the composed line subsequent to its assemblage for dividing the line into short measures, and means interconnecting all said abutments for holding them fixed at predetermined positions, in combination with mechanism for justifying the several measures between the abutments so held, an assembler, means for producing interstices in the line during assemblage, and means for associating the line and said device so as to cause its intermediate abutment to be engaged in said interstices of the line.

16. In a typographical machine, a tabular means comprising in combination one or more measure separators each forming a connected part of the machine, means independent of the line of matrices for adjusting each separator to the desired point in the line according to the short measures to be produced, and for permitting its movement at said point into or out of the path of the assembling matrices, the said separators adapted to disengage from the line when the assembler elevator lifts, leaving interstices into which corresponding separators mounted on the line carriage enter; together with said assembler elevator, said line carriage, the separators thereon, a first elevator, and a vise having abutments, the said line-carriage-separators adapted to disengage from the line when the so-called first elevator descends, leaving interstices into which corresponding abutments mounted on the casting vise enter to remain there during casting.

17. In a typographical machine for producing tabular matter, having an assembler, a justifying mechanism and means to transfer a composed line from the former to the latter, the combination thereof with one or more temporary separators, means to interpose them at predetermined points in the line being composed to produce interstices according to the tabulation to be produced, means for causing the separators to dissociate from the line when the latter is transferred, and abutments adapted to occupy said interstices before and during justification, said abutments having means to hold them at fixed predetermined points with respect to each other and the line during justification.

18. In a typographical machine for producing tabular matter, having an assembler, a justifying mechanism and means to transfer a composed line from the former to the latter, the combination thereof with one or more temporary separators, means to interpose them at predetermined points in the line being composed to produce interstices according to the tabulation to be produced, means for causing the separators to dissociate from the line when the latter is transferred, and abutments adapted to occupy said interstices before and during justification, said abutments having means to hold them at fixed predetermined points with respect to each other and the line during justification; and said justifying mechanism constructed to operate independently upon each of the short measures between the respective abutments.

19. In a typographical machine, the combination with an assembler, and a justifying mechanism, of temporary separators adapted to be inserted in the line being composed; means for dissociating the said line and separators from each other; means for substituting, prior to justification, other separators and subsequently abutments for the first named separators, which abutments remain in the line during justification.

20. In a typographical machine, the combination with an assembler, and a justifying mechanism, of temporary separators adapted to be inserted in the line during assemblage and to remain there until the line is assembled; means for dissociating the assembled line and separators from each other; and means for substituting other separating means for the first named separators after assemblage, and maintaining such other separating means in the line during justification.

21. In a typographical machine, the combination with an assembler, and a justifying mechanism, of temporary separators adapted to be inserted in the line during assemblage and to remain there until the line is assembled; means for dissociating the assembled line and separators from each other and transferring the line to the justifying mechanism; and means for substituting abutments for said separators, which abutments remain in the line during justification.

22. In a typographical machine in which a composed line is formed with interstices by insertion of separators between each two adjacent measures, the combination of the assembler, said separators, means for moving the line from the assembler to the justifying position, the mold, a justifying mechanism, and a vise constructed with fixed abutments, adapted to coöperate with the said separators to maintain the interstices in their operative position in respect of the said mold.

23. In a typographical machine, the combination of an assembler having an advancing motion as the line assembles, one or more temporary separators adapted to be inserted in the line being assembled by a motion transverse to the motion of said assembler, each separator being longitudinally adjustable relatively to the assembler and mounted to be carried along therewith and with the expanding line, and all the separators adapted to be simultaneously dissociated from the completely assembled line as a consequence of the movement of the latter from the place of assemblage.

24. In a typographical machine, the combination of an assembler, a plurality of temporary separators each capable of being inserted in the line being composed therein and dissociated therefrom, a line carriage having separators corresponding in number and relative position with those in the assembler and respectively adapted to take the places previously occupied in the line by the first named separators.

25. In a typographical machine, the combination of an assembler, one or more temporary separators adapted to be interposed in the line during assemblage, a vise having abutments corresponding in number and relative position with the temporary separators and respectively adapted to take the places previously occupied in the line by the said separators.

26. In a typographical machine for producing tabular matter, the combination of an assembler adapted to advance as the line forms, justifying mechanism, one or more prepositioned separators forming connected parts of the machine and each movable transversely of the assembler's movement, a device including a movable lever for moving such separators transversely into the line during its assemblage, and an assembler stop device including means for automatically arresting the assembler at one or more positions corresponding to the separator positions, to enable the separators to be successively inserted.

27. In a typographical machine for producing tabular matter, the combination of an assembler, justifying mechanism, one or more separators forming connected parts of the machine, a device for inserting such separators at given positions in the line during its assemblage, said assembler adapted to progress as the line is produced, an assembler stop device including means for arresting the assembler at one or more positions corresponding to the separator positions, and a stop-releasing means actuated by said separator-inserting device for releasing the assembler to permit its continued progress.

28. In a typographical machine, the combination with temporary separators adapted to be inserted in the line being composed, of a separator-supporter having means to move it from and to its normal position; means whereby each inserted separator may be engaged with the said supporter in normal position; means for dissociating the composed line and inserted separators; means for disengaging the last mentioned separators from the supporter when out of normal position; and means for returning the latter to its normal position.

29. In a typographical machine, the combination with an assembler and justifying mechanism, of means for producing interstices at predetermined positions in the line during assemblage, a line carriage having separators, and a vise having abutments, both said separators and abutments adjustable according to the position to be maintained in the justified line of the interstices between the measures.

30. In a typographical machine, the combination with an assembler and justifying mechanism, of means for producing interstices at predetermined positions in the line during assemblage, a line carriage, separators on said line carriage, means for adjusting said separators according to the position to be maintained in the justified line of the interstices between the measures, and means for disengaging the line from the assembler and engaging it with said carriage.

31. In a typographical machine, the combination with an assembler for carrying a horizontal line of matrices, of one or more temporary separators arranged below the same, each adapted to be moved lengthwise upward into operative position in the line being assembled to form an interstice, and means whereby the assembled line is dissociated from the separators by lifting the line, and whereby the interstices are preserved.

32. In a typographical machine, the combination with the assembler of a separator adapted to be inserted from below into the line being composed in the assembler, and a rotating star wheel having its arms curved on the sides thereof nearest the rising separator, substantially for the purposes described.

33. In a typographical machine, the combination of a rotating star wheel, an assembler, means to deliver matrices to the assembler adjacent to and from above the star wheel to compose a horizontal line, and a separator constructed to be forced into the line being assembled from the lower side of the star wheel, opposite the matrix-delivery, said star wheel being so rotated that its arms nearest the matrix line move downward and having its arms so constructed as to admit the separator between the rotating wheel and a matrix.

34. In a typographical machine, the combination of an assembler, one or more temporary separators, means for carrying the same along with the line being composed, and a key lever adapted to engage with that separator temporarily in register with it for inserting it in the said line.

35. In a typographical machine, the combination of an assembler, one or more separators, means for carrying the same along with the line being composed; a key lever adapted to engage with the separator temporarily in register with it for inserting it in the said line; a separator-supporter having means to move it from and to its normal position; means for causing each separator, after it has been inserted, to engage with the said supporter; means for dissociating the composed line and inserted separators; means for disengaging all the separators from the supporter; and means for returning the latter to its normal position.

36. In a typographical machine, the combination of an assembler, one or more separators, means for adjusting them, means for carrying the same along with the line being composed; a key lever adapted to engage with the separator temporarily in register with it for inserting it in the said line; a separator-supporter having means to move from and to its normal position; means for causing each separator, after it has been inserted, to engage with the said supporter; means for dissociating the composed line and inserted separators; means for disengaging all the separators from the supporter; means for returning the latter to its normal position; and a graduated device for locating the separators.

37. In apparatus for justifying a line of tabular matter in a typographical machine, the combination of a justification block consisting of a number of heads independently yieldingly supported, and detachable parts adapted to be secured to the heads to associate the said heads in groups according to the number and lengths of the measures.

38. In a typographical machine, a justification block having heads 40, 41, arranged in pairs, the two heads of each pair being scarfed together.

39. In a typographical machine, means for supporting short measure type bars independently of each other as they are being ejected, comprising in combination, a notched plate having slots and holes therein, ledges capable of attachment to the plate having hooks and projections thereon adapted to engage with the notches or slots and with the holes respectively, and a key adapted to engage between the back of the plate and the hooks to hold the ledges to the plate.

40. In a typographical machine, a galley having a back plate characterized by series of slots set out according to the typographic scale in use; shelves having hooks adapted to pass through the respective slots and to project beyond the said back; and a key adapted, by engaging between the hooks and galley back, to lock the shelves to the latter.

41. In a typographical machine, the combination of means for assembling matrices in line, means operating during assemblage for dividing the line into groups of predetermined length, and means presented to each group of the line after assemblage for preserving the groupal division of the line from the time of assemblage to the time of casting.

42. In a typographical machine, the combination of means for assembling matrices in line, means operating during assemblage for dividing the line into groups of predetermined length, and means presented to each group of the line after assemblage and operating thereon throughout its travel from the assembler to casting position for preserving the groupal division of the line.

In witness whereof we have hereunto set our hands in the presence of two witnesses.

CARL MUEHLEISEN.
GUSTAV MOLKENTHIN.
LEOPOLD LEIDENBERG.

Witnesses:
HENRY HASPER,
WOLDEMAR HAUPT.